US000001457H

United States Statutory Invention Registration [19]

[11] Reg. Number: H1457

Sullivan, Jr.

[43] Published: Jul. 4, 1995

[54] FUEL AIR EXPLOSIVE CANISTER

[75] Inventor: John D. Sullivan, Jr., Edgewood, Md.

[73] Assignee: The United States of America as represented by the Secretary of the Army, Washington, D.C.

[21] Appl. No.: 953,165

[22] Filed: Sep. 29, 1992

[51] Int. Cl.[6] ..... F42B 3/00

[52] U.S. Cl. ..... 102/324; 102/331; 102/465

[58] Field of Search ..... 102/323, 324, 331, 465

[56] References Cited

U.S. PATENT DOCUMENTS

| | | | |
|---|---|---|---|
| H161 | 8/1986 | Sullivan | 102/363 |
| 721,431 | 2/1903 | Durham | 102/24 |
| 1,091,878 | 3/1914 | Cordray | 102/24 |
| 3,420,173 | 1/1969 | Slawinski et al. | 102/24 |
| 3,517,616 | 6/1970 | Martin | 102/24 |
| 3,596,602 | 8/1971 | Gey et al. | 102/90 |
| 3,645,205 | 2/1972 | Dowling et al. | 102/24 |
| 3,687,076 | 8/1972 | Friant et al. | 102/24 |
| 3,691,954 | 9/1972 | Kern | 102/24 |
| 3,730,093 | 5/1973 | Cummings | 102/6 |
| 4,132,169 | 1/1979 | Gay et al. | 102/6 |
| 4,157,928 | 6/1979 | Falterman et al. | 149/109.2 |

*Primary Examiner*—Peter A. Nelson

*Attorney, Agent, or Firm*—Freda L. Krosnick; Frank J. Dynda; Muzio B. Roberto

[57] ABSTRACT

A fuel-air explosive apparatus comprising a standard plastic beverage bottle, a plastic burster tube, a conventional detonator, a detonating cord, Teflon® tape and a liquid fuel. All of the components of the fuel-air explosive apparatus are readily available, standard materials.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL AIR EXPLOSIVE CANISTER

GOVERNMENTAL INTEREST

The invention described herein may be manufactured, used and licensed by or for the U.S. Government without payment to me of any royalty thereon.

BACKGROUND OF THE INVENTION

The present invention deals with an improved fuel-air explosive canister which is used solely for experimental purposes. Said fuel-air explosive canister apparatus may be built using readily available, inexpensive materials. The present invention employs conventional, plastic soft drink bottles, such as those set forth in U.S. Pat. No. 3,733,309, issued to Wyeth et al. Use of these materials makes experimentation in the fuel-air explosive art easily attainable and cost efficient.

Difficulties associated with combustible fuel-air dispersion devices include the extensive, for example machine shop, work required for the manufacture and assembly of fuel-air explosive devices. Moreover, prior art fuel-air explosive devices generally were constructed using various amounts of metal and/or glass materials. Use of these materials can cause danger of fragmentation.

U.S. Pat. No. 3,596,602, issued to Gey et al., teaches a method and apparatus for delivering biological and chemical warfare agents using fuel-air explosive. The teaching is silent as to the composition of the delivery system per se. General mention is made to the use of canisters in the employ of said invention. Specific canisters, however, which may be employed by Gey et al. have not been set forth. Moreover, the teaching is not directed to fuel-air experimental devices. Nor is Gey et al. directed to a device having as basic a structure as the present invention.

U.S. Pat. No. 3,730,093, issued to Cummings, teaches a fuel-air explosive weapon improved by its use of implosion. Applicant is unaware of any fuel-air weapon, to date, which employs implosion. One of the numerous fuels which may be employed therein is propylene oxide. The preferred embodiment employs a cylindrical plastic container which has a circular bottom end plate and a top plate, each of which may be composed of various metallic materials. Moreover, the device further requires the presence of a layer of high explosives around the housing of the fuel-air explosive device. The device taught therein is more complex than that employed by the present invention.

U.S. Pat. No. 4,157,928, issued to Falterman et al., relates to improved fuels for fuel-air explosive weapons. The fuel-air explosive device described employs a metallic container. The teaching is silent as to the use of plastic containers, not to mention the employ of conventional, plastic beverage bottles. The reference concentrates on the composition of the fuel employed therein.

Well known fuel-air type devices are further described in U.S. Pat. No. 4,132,169, issued to Gay et al. The devices taught contain two separate, sealed, concentrically arranged chambers. Within the central chamber is housed a low brisance explosive. The device is primarily constructed of metallic materials. The device taught by Gay et al. requires more operating component parts than that of the present invention. The complexity of the present invention is nowhere near that of Gay et al.

The closest prior art teaching is set forth in Statutory Invention Registration (SIR) Number H161, issued to the inventor of the present invention. SIR H161 teaches a scaled down testing of explosive chemicals using a small fuel-air explosive plastic bottle. The bottle holds 264 ml of liquid fuel; it has a threaded cap with a hole running through its center to facilitate electrical wires from a detonator; and employs a centrifuge tube having a flange lip for a seal. The teaching therein does not employ readily available materials—264 ml bottles, threaded caps having a hole, etc.

The present invention employs readily available materials which may be unobviously combined to form the present invention. The fuel-air explosive device herein may be assembled without employing, for instance, complex machine shop equipment or welding. In addition, the construction of the present invention is devoid of metal and glass materials, hence the hazard associated with the fragmentation of the apparatus is reduced, if not eliminated.

The present invention provides for a non-complex, fuel-air explosive device intended solely for experimental purposes.

BRIEF DESCRIPTION OF THE INVENTION

The present invention relates to a fuel-air explosive apparatus which comprises a readily available standard plastic beverage (soft drink) bottle, a plastic burster tube, a conventional detonator, a detonating cord, Teflon® tape and liquid fuel. The novelty of the invention resides in the unobvious combination of these conventional component parts.

The present invention provides a means for constructing, for experimental purposes, a fuel-air explosive apparatus which may be constructed from materials which are inexpensive as well as readily available. Moreover construction of the present invention does not require the use of highly technical machine shop devices, or other complex tools. It is simply constructed by hand.

Accordingly, it is an object of the present invention to provide a fuel-air explosive apparatus which is used solely for experimental purposes.

It is a further object of the invention to provide a fuel-air explosive apparatus which may be tested on small ranges that cannot accommodate the safe testing of weapon size fuel-air explosive devices.

It is a further object of the invention to provide a fuel-air explosive apparatus which may be constructed using conventional and readily available component parts.

It is a further object of the invention to provide a fuel-air explosive device which may be assembled without employing complex machine shop equipment or welding apparatus.

It is still a further object of the invention to provide a fuel-air explosive apparatus which is devoid of metal and glass materials.

Still a further object of the invention is to provide a leakproof fuel-air device for use in detonation physics and operations research.

Other objectives of the present invention will be apparent from the following detailed description of the invention.

DETAILED DESCRIPTION OF THE INVENTION

The invention comprises a fuel-air explosive device which employs a conventional, readily available standard plastic beverage bottle—i.e. 0.5-liter, 1-liter, 1.5-liter, 2-liter or 3-liter soda bottle; a plastic burster tube—i.e., PVC; a conventional detonator; a detonating cord; Teflon® tape and liquid fuel.

The soft drink industry has universally standardized its plastic containers. All brands share the same general design and the same sizes. These bottles are able to withstand commercial handling and are of an ideal size for experimentation. These plastic containers can be found in various sizes—0.5-liter, 1-liter, 1.5-liter, 2-liter and 3-liter. All, but the 3-liter plastic container, share the ½ inch cap size and neck.

Commercial plastic plumbing pipes are available in sizes which are suitable to render a close sliding fit within the neck of these size bottles. This plumbing pipe, preferably made of PVC, is employed as a bursting tube and in the following fashion. It is sealed at one end using preferably a conventional epoxy cement. The sealed end is inserted into the plastic bottle until it rests at the bottom therein. The pipe is then cut so that it is a certain length which allows approximately one inch of the pipe to extend above the bottle neck. The pipe should then be marked using a pencil to draw a line to indicate the location where the pipe emerges out of the bottle neck.

At this pencil mark, continuing approximately ¾ of an inch below it, Teflon® tape having a width of approximately ½ inch is wound around the tube. The Teflon® tape facilitates a snug fit of the plastic pipe within the plastic bottle neck. The plastic pipe/tube is engaged in place with a moderately forceful twist and push towards the bottom of the bottle. Although a locating cup may be employed at the bottom of the bottle to hold the plastic pipe in position, it is not deemed necessary. The neck length of the universal bottle is sufficient to hold the plastic burster, pipe/tube in a central position.

If one wishes, a fill mark can be labelled using conventional means, i.e. wax pencil, on the shoulder of the plastic bottle. This may be accomplished by filling the bottle with water and inserting the plastic pipe therein. Once the plastic pipe is inserted, the water will overflow. After this has occurred, the plastic pipe is withdrawn and the level at which the remaining water is present is where the fill mark should be labelled. Because the fuels which may be employed herein are potentially harmful, this procedure is advised to secure against spillage. One fuel that is most often employed in the fuel-air explosive art is propylene oxide. However, any fuel that is liquid at normal temperature and pressure is a candidate for use within the scope of this invention.

The plastic burster tube contains therein a detonating cord and a detonator. These individual components are conventional in the art. The open, top portion of the burster tube is packed closed using an inert and conventional duct-sealant putty of the type which may be employed in the electrical and plumbing arts. The detonating cord employed is approximately 1/100 to 1/250 the weight of the fuel used. Detonator wires extend through the putty sealant and are connected to a conventional electric firing line. When the electric firing line causes the detonator to explode the detonating cord, the shock wave and the expanding gases caused thereby break the plastic bottle apart and propel the liquid fuel therein outwards. The liquid fuel atomizes against the air and the fuel droplets then rapidly form a cloud of a fuel-air mixture.

Note that the conventional detonating cord, which may be employed, is a plastic jacket wrapped around a core of powdered explosive. This powdered explosive, upon detonation, changes to hot, expanding gas which generates the shock wave described above.

This cloud is then detonated by a blast from approximately 50 to 220 grams of conventional high explosive, which is located proximate to the bottle so as to be within the cloud. Among the explosives suitable for this purpose are military high explosives, such as Compsition C-4, Composition B, or Pentolite. The explosive employed is detonated at a predetermined, appropriate delay time after the firing of the detonator in the burster tube.

The delay time feature is a feature common to the fuel-air explosive art area; and the optimum delay time may be determined experimentally. The necessary delay time lengthens as bottle size increases. This delay allows time for the expanding cloud to assume a size wherein there is a combustible ratio of fuel weight to air weight. An initial, trial delay time is dialed into a conventional electric time delay generator, which closes the firing line circuit to the electric detonator present within the proximate high explosive. The entire cloud is thereby caused to detonate. One having ordinary skill in the fuel-air explosive art would be familiar with the operation of a delay time feature.

The above description may be applied to the use of a conventional, plastic 3-liter beverage bottle; however, the plastic pipe/tube employed to form the burster tube should be approximately ¾ inch plastic pipe (i.e. PVC pipe). More wrapping of Teflon® tape around the pipe is used to serve the same purpose described above.

Other features of the present invention will be apparent from the following drawing and its description.

DETAILED DESCRIPTION OF THE DRAWINGS

Figure 1:
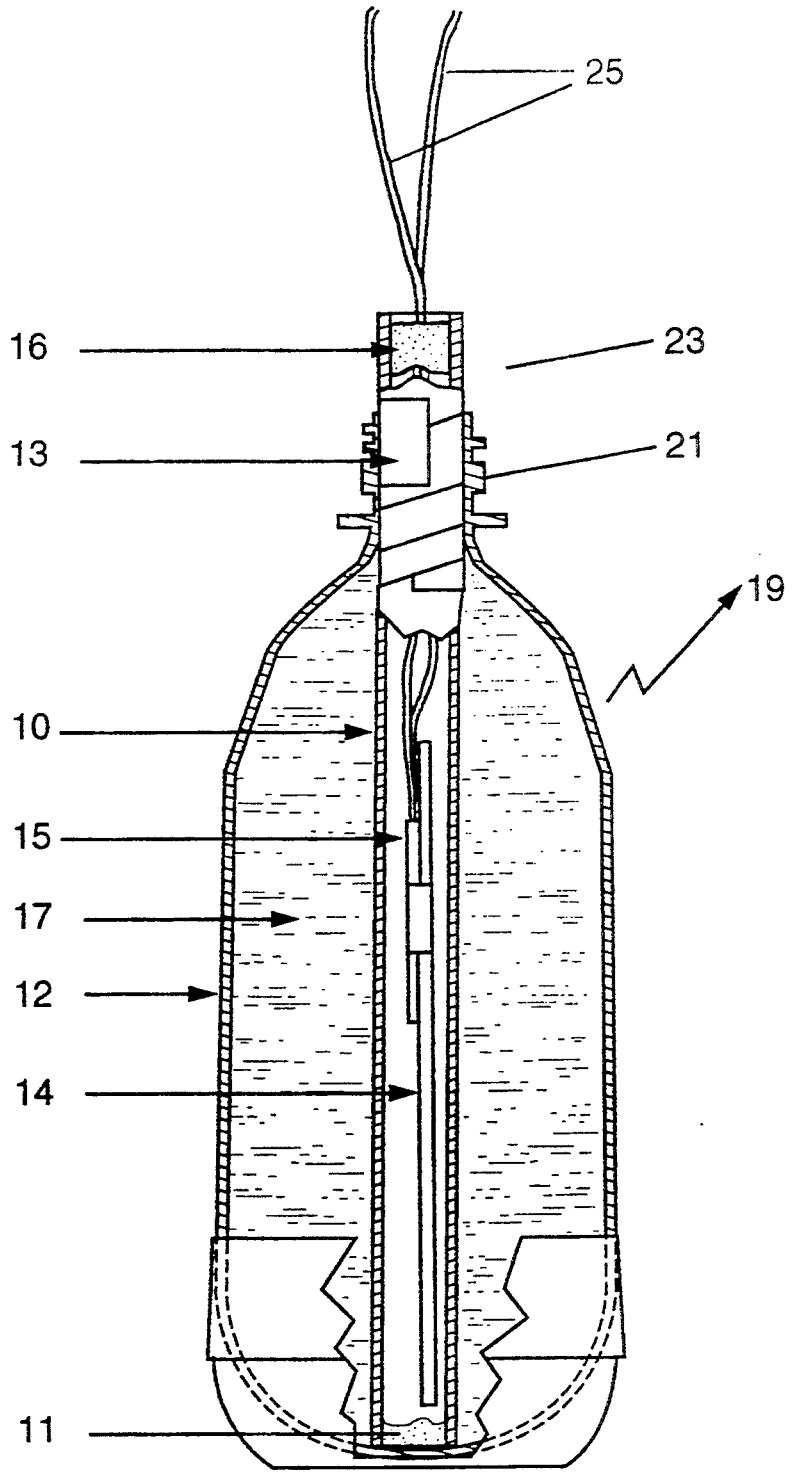
FIG. 1 is a schematic representation of a fuel-air explosive device within the scope of the present invention.

The drawing will be further discussed in order to provide a better understanding and description of the present invention.

FIG. 1 illustrates a schematic representation of a fuel-air explosive device 19 within the scope of the present invention. Said fuel-air explosive device 19 employs a plastic, standardized soft drink bottle 12, which may be of various available and standard sizes—i.e., 0.5-, 1-, 1.5- 2- or 3-liter. Within bottle neck 21, a commercial plastic pipe (i.e. PVC pipe) 10, which will additionally be referred to as a burster tube, is slideably inserted.

Said burster tube 10 may be sealed at the end entering into said bottle 12 with epoxy cement 11 so as to form a leakproof seal. Once the sealed burster tube 10 has been completely inserted and touching the bottom of said bottle 12, it 10 is cut preferably at approximately one inch 23 above the bottle 12 height. With the burster tube 10 still in place within the bottle 12, a mark should be drawn onto said burster tube 10 so as to indicate the location in which the burster tube 10 emerges from said bottle neck 21.

The burster tube 10 is then removed from the bottle 12; and ½ inch Teflon ® tape 13 is wound once or twice around the tube 10 beginning at said mark in which the tube 10 emerges from the plastic bottle 12. The Teflon ® tape 13 should extend from the ring mark down approximately ¾ inch in the direction of the bottle neck 21. Said tape 13 will provide a seal between the tube 10 and the neck 21 of the bottle.

The burster tube 10 is loaded with detonating cord 14 and a detonator 15. The top of burster tube 10 is packed closed with an inert duct-sealant putty 16. Note that detonator wires 25 extend through putty 16. The type of putty 16 which is employed is that which is conventional in the electrical and plumbing arts. These detonator wires 25 are attached to an electric firing line (not shown).

When detonating cord 14 is activated, the resulting shock wave and expanded gases (not shown, but previously described) created by the activation break the bottle 12 and push out the liquid fuel 17. Because its 17 movement is resisted by the surrounding air, the liquid fuel 17 is atomized into droplets and subsequently forms a cloud of fuel-air to be later detonated by 50 to 220 grams of a high explosive (not shown) which is set to detonate at a specific delay time.

SPECIFIC EMBODIMENT OF THE INVENTION

A plastic, two-liter soft drink bottle (soda bottle) is employed in this specific example. Thirteen inches of ½ inch polyvinyl chloride (PVC) tube is used as the burster tube. Into the burster tube is slid two-by-nine inches of 100 grain/foot detonating cord with a detonator taped thereto. (Detonating cords, such as Primacord ® or Detacord ®, manufactured by Ensign Bickford Company of Simsbury, Conn., may be employed.) The top end of the burster tube is then packed to a depth of one or two inches with a conventional duct-work putty.

The apparatus of the invention as used herein creates a dispersion of the propylene oxide, which at 66 milliseconds after bottle break, appears as a white cloud having a radius of approximately 7.0 feet. Said cloud has a thickness at its central point of several 2-liter beverage bottle heights. This white cloud is to be detonated using one quarter pound of Composition C-4 electrically detonated at a delay time of 66 milliseconds but not less than 50 milliseconds, and certainly no longer than 80 milliseconds. The C-4 is placed at approximately 3–3.5 feet from the side of the bottle.

These specific parameters may be adjusted to serve the individual needs of the user. They have to be altered, in addition, depending upon the size of the plastic bottle employed. Consideration should be given to the effect of the fuels and/or solvents on the bottle and burster tube. For instance, the preferred fuel, propylene oxide, is a powerful solvent, as are most candidate fuels. They affect the resin of plastic beverage bottles (i.e., those made of polyethylene terephthalate) as well as PVC burster tubes. After one to two days, a 2-liter beverage bottle containing propylene oxide will shrink to have a volume of merely 1.4 liters. Hence, when propylene oxide is employed, it should be filled into the bottle just prior to use. These and numerous other considerations should be evaluated prior to employing the apparatus of the invention.

Numerous types of burster tubes, caps and seals for the burster tubes have been tested. They have all been proven to be unsatisfactory against leaks resulting from the employ of solvent fuels. Use of Teflon ® tape to seal the burster tube to the plastic bottle was the only successful solution to effectuate a proper seal for the present invention.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

I claim:

1. A fuel-air explosive apparatus comprising
a standard sized, plastic beverage bottle;
a liquid fuel;
a plastic burster tube;
a detonator;
a detonating cord; and
sealant tape,
wherein said standard sized, plastic beverage bottle contains therein said liquid fuel; wherein said plastic burster tube contains therein said detonator and said detonating cord; wherein said burster tube and its contents are inserted into the opening of said beverage bottle; and wherein said sealant tape facilitates a snug fit of said plastic burster tube within said standard sized, plastic beverage bottle.

2. A fuel-air explosive apparatus as set forth in claim 1, wherein said standard sized, plastic beverage bottle is of a size selected from the group consisting of 0.5-liter, 1-liter, 1.5-liters, 2-liters and 3-liters.

3. A fuel-air explosive apparatus as set forth in claim 1, wherein said liquid fuel is propylene oxide.

4. A fuel-air explosive apparatus as set forth in claim 1, wherein said plastic burster tube is polyvinyl chloride (PVC) tubing having a diameter of approximately 0.5 to 0.75 inches.

5. A fuel-air explosive apparatus as set forth in claim 1, wherein said sealant tape is Teflon ®.

* * * * *